(12) United States Patent
Bradley (10) Patent No.: US 6,909,074 B1
(45) Date of Patent: Jun. 21, 2005

(54) TELESCOPIC HEAT-GENERATING MAT

(76) Inventor: Gary M. Bradley, 181 Littleton Rd. Building 4 Unit 440, Chelmsford, MA (US) 01824

( * ) Notice: Subject to any disclaimer, the term of this patent is extended or adjusted under 35 U.S.C. 154(b) by 0 days.

(21) Appl. No.: 10/921,420

(22) Filed: Aug. 19, 2004

(51) Int. Cl.[7] .............................................. A47B 97/00
(52) U.S. Cl. ........................ 219/528; 219/535; 219/548
(58) Field of Search ........................ 219/211, 528, 535, 219/548, 549, 546; 428/208, 408; 37/199

(56) References Cited

U.S. PATENT DOCUMENTS

| | | | |
|---|---|---|---|
| 5,854,470 A | 12/1998 | Silva | |
| D406,000 S | 2/1999 | Hartranft | |
| 5,966,502 A | 10/1999 | Pearce | |
| 5,998,770 A | 12/1999 | Sundby | |
| 6,184,496 B1 | 2/2001 | Pearce | |
| 6,197,045 B1 | 3/2001 | Carson | |
| 2001/0053927 A1 | 12/2001 | Bradley | |

*Primary Examiner*—Christopher J. Novosad (57) ABSTRACT

A portable device for providing a heated surface to melt snow and ice therefrom includes a reservoir having a top surface provided with an opening, a plurality of apertures, and a mechanism for conveniently heating fluid disposed within the reservoir. The heating mechanism is operably connected to the reservoir, a plurality of mats removably attachable to each other along a substantially rectilinear path and a plurality of flexible conduits in fluid communication with the reservoir and the plurality of mats. The heating mechanism includes a plurality of programmable sensors for selectively activating the device when a temperature falls below a desired temperature threshold.

18 Claims, 5 Drawing Sheets

TELESCOPIC HEAT-GENERATING MAT

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to snow-melting devices and, more particularly, to a telescopic heat-generating mat to melt snow and ice from a person's shoes.

2. Prior Art

The use of snow melting devices is known in the prior art. More specifically, Snow melting devices heretofore devised and utilized are known to consist basically of familiar, expected and obvious structural configurations, notwithstanding the myriad of designs encompassed by the crowded prior art which have been developed for the fulfillment of countless objectives and requirements.

Heating elements have been used in the past to warm walkways and driving surfaces to prevent the accumulation of snow and ice. In general, these devices are relatively portable and are storable when not in use. However, all of these prior art devices have various shortcomings. For example, some devices require the use of large quantities of electrical energy to heat and maintain a temperature sufficient to melt a relatively small surface area of ice and snow. Other devices have designs that are impractical for exterior use and poses safety concerns including a potential shock hazard and short circuiting of the device, if it becomes submerged in melted snow and ice.

In addition, further devices that are made up of individual tubes are impractical for vehicular traffic. If enough weight is placed on one or more of the individual tubes, fluid flow is greatly diminished, if not completely blocked from a particular section of the device which allows the accumulation of ice and snow on the affected section. In other embodiments, the devices are made up of rigid panels which restrict their usefulness to flat even surfaces and make movement and storage difficult.

Accordingly, a need remains for a telescopic heat-generating mat to overcome the above-noted shortcomings.

BRIEF SUMMARY OF THE INVENTION

In view of the foregoing background, it is therefore an object of the present invention to provide a device for a telescopic heat-generating mat to melt snow and ice. These and other objects, features, and advantages of the invention are provided by a portable device for providing a heated surface to melt snow and ice therefrom.

The device includes a reservoir that has a top surface provided with a top opening for receiving a predetermine quantity of fluid therethrough. Such a reservoir further has a plurality of apertures for directing fluid with a first temperature outwardly therefrom and for receiving fluid with a second temperature. A power supply source is electrically coupled to the reservoir for operating the heating mechanism (described hereinbelow). Conventional power supply sources may be employed, which provide sufficient current to operate the present invention.

The reservoir preferably includes inner and outer spaced shells forming a gap therebetween and extending about a perimeter of the reservoir. The inner and outer shells are preferably formed from metal or other suitable materials, well known in the industry. A lid is removably securable to the top opening and is provided with a conduit for allowing a user to access an interior of the reservoir. A cap having a threaded inner surface is removably securable to the conduit for assisting to prevent heat and fluid from escaping the reservoir. The device may further have a flexible layer formed from insulating material disposed medially of the inner and outer shells. Such an inner layer may be formed from conventional heat-retaining materials commonly employed in the construction industry.

Advantageously, the present invention further includes a mechanism for heating fluid disposed within the reservoir. Such a heating mechanism is operably connected to the reservoir and includes a first section disposed therein and a second section disposed exterior thereof. The heating mechanism further includes a control panel electrically coupled thereto for allowing a user to selectively adjust the first fluid temperature as needed. Of course, the control panel may include a thermostatic dial for allowing a user to selectively adjust the fluid temperature, as needed.

The heating mechanism preferably includes a pump electrically coupled to the power supply source and a fluid distribution line extending from the pump and into the reservoir for connecting to the plurality of conduits respectively. The pump may be position within the reservoir or outside the reservoir, as desired by the user. Conventional pumps, commonly employed by fish tanks, may be used for the present invention, for example. The heating mechanism may further include a fluid intake line including a filter and is submerged beneath the fluid level of the reservoir. The fluid intake line cooperates with the distribution line for channeling heated fluid thereto. The heating mechanism also includes a heating coil positioned along a bottom surface of the reservoir and subjacent the fluid intake line wherein the heating coil is connected to the power supply source and for heating fluid housed within the reservoir.

The heating mechanism preferably further includes a plurality of sensors operably connected to the pump and the power supply source for measuring and displaying the amount of fluid housed within the reservoir and the temperature of the fluid respectively so that an operator can selectively heat the plurality of mats as desired.

The present invention further includes a plurality of mats removably attachable to each other along a selected path. Each mat is coated with a thermal-resistive layer for assisting the high-temperature fluids passing therethrough to be maintained within a selected tolerance level so that ice and snow can be effectively melted during inclement weather conditions. The plurality of mats are advantageously formed from heat-retaining material and have a plurality of sockets formed therein as well as a plurality of flange portions extending outwardly therefrom. The plurality of flange portions are oppositely aligned from the plurality of sockets and are removably insertable therein for maintaining the plurality of mats in a contiguous relationship along a substantially rectilinear path. Of course, such mats may be arranged in alternate patterns such as along a stepped-up platform or about an annular walk-way, for example.

Each the plurality of mats further has opposed side portions wherein the plurality of conduits (described hereinbelow) traveling substantially parallel thereto. Advantageously, the plurality of conduits include ancillary portions traversing through the plurality of mats at spaced locations along a length thereof so that heated fluid can be channeled therethrough.

The present invention preferably includes a plurality of elongated and flexible conduits in fluid communication with the reservoir and the plurality of mats for channeling the first temperature fluid towards and through the plurality of mats and for directing the second temperature fluid away from the plurality of mats wherein the second temperature is lower than the first temperature.

Advantageously, the present invention further includes a protective tube formed from non-corrosive material that is positioned about the plurality of conduits. Such a tube extends between the reservoir and a partial length of the plurality mats and is preferably formed from hard plastic for shielding the plurality of conduits from environmental conditions and insulating same during operating conditions.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures. Prime/double prime notations refer to alternate embodiments of like elements.

The device of this invention is referred to generally in FIGS. 1–10 by the reference numeral 10 and is intended to provide a telescopic heat-generating mat to melt snow and ice. It should be understood that the device 10 may employ various fluids having alternate heat-retaining properties and should not be limited to employing only water.

Figures 1, 2:
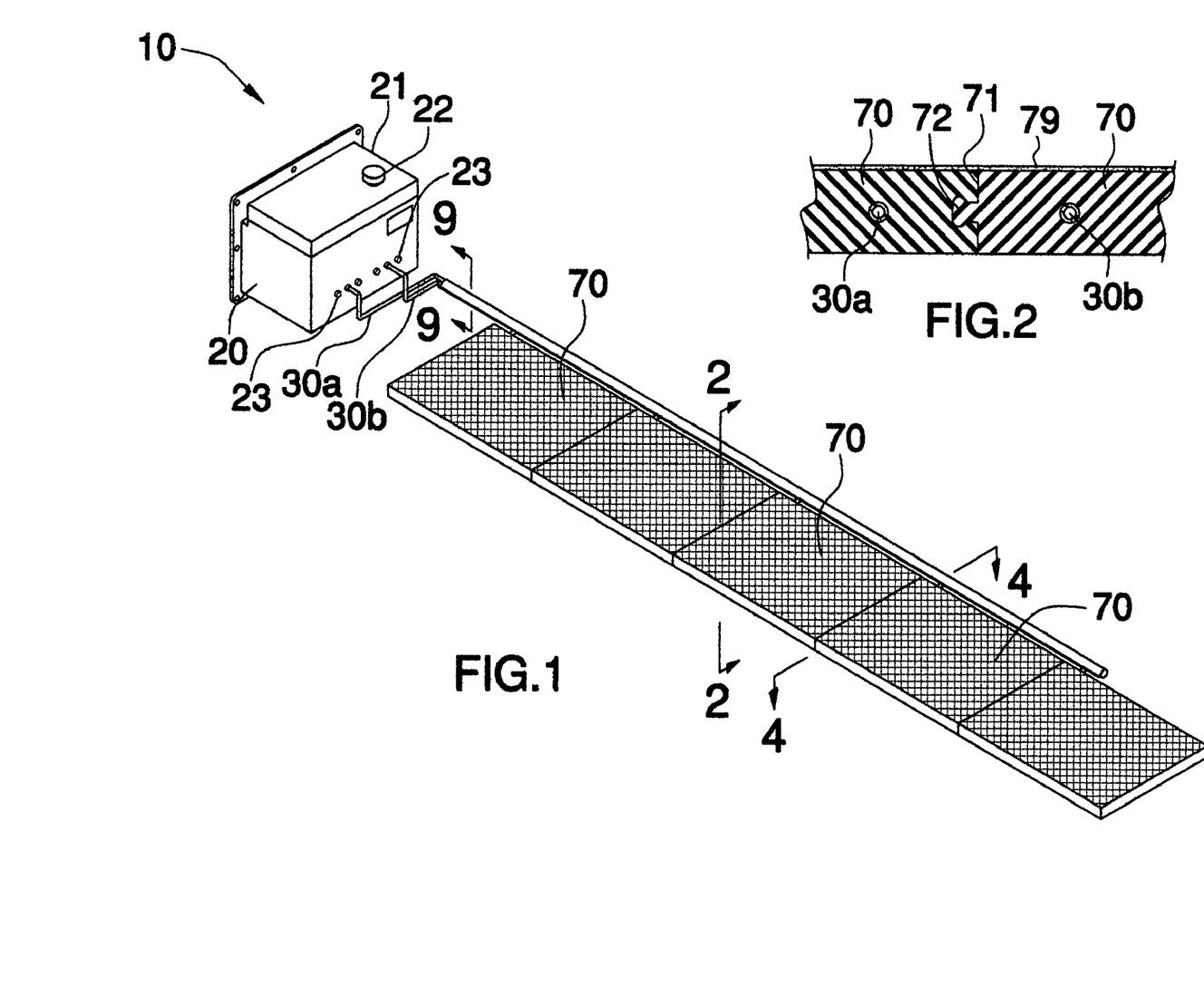
FIG. 1 is a perspective view showing a telescopic heat-generating mat to melt snow and ice, in accordance with the present invention.
FIG. 2 is a cross-sectional view of the device shown in FIG. 1, taken along line 2—2, wherein the mats are coated with a thermal-resistive layer for improved insulation.

Referring initially to FIG. 1, the device 10 includes a reservoir 20 that has a top surface 21 provided with a top opening 22 for receiving a predetermine quantity of fluid therethrough. Such a reservoir 20 further has a plurality of apertures 23 for directing fluid 30a with a first temperature outwardly therefrom and for receiving fluid 30b with a second temperature. Briefly referring to FIG. 5, a power supply source 40 is electrically coupled to the reservoir 20 for operating the heating mechanism 50 (described hereinbelow). Conventional power supply sources having 12 volt transformers may be employed, which provide sufficient current to operate the present invention.

Figure 8:
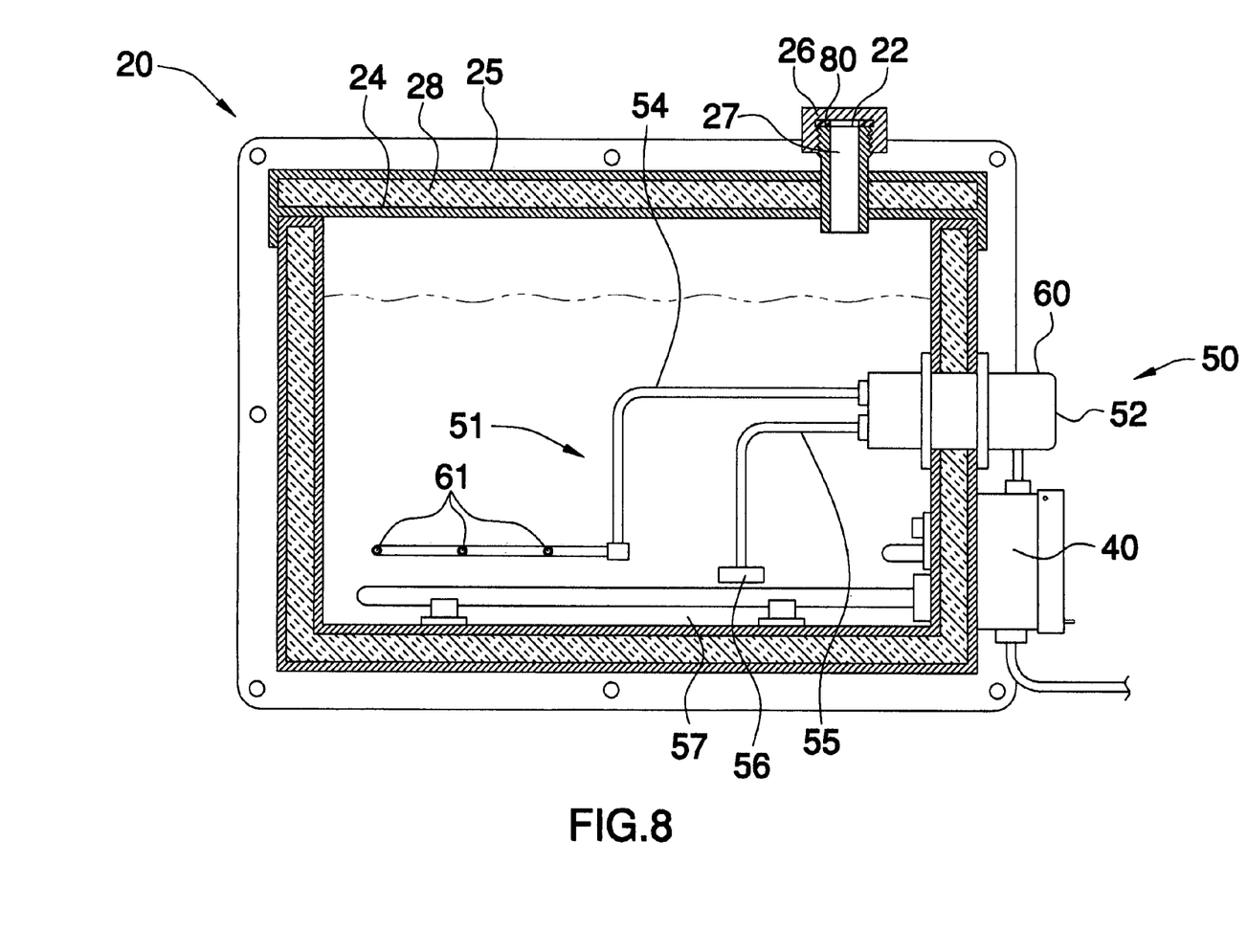
FIG. 8 is a cross-sectional view of the reservoir, which houses the pump, heating coil fluid conduits, taken along line 8—8 in FIG. 6.

Now referring to FIG. 8, the reservoir 20 preferably includes inner 24 and outer 25 spaced shells forming a gap therebetween and extending about a perimeter of the reservoir 20. The inner 24 and outer 25 shells are preferably formed from metal or other suitable materials, well known in the industry. A lid 26 is removably securable to the top opening 22 and is provided with a conduit 27 for allowing a user to access an interior of the reservoir 20. A cap 80 having a threaded inner surface is removably securable to the conduit 27 for assisting to prevent heat and fluid from escaping the reservoir 20. The device 10 may further have a flexible layer 28 formed from insulating material disposed medially of the inner 24 and outer 25 shells. Such an inner layer 28 may be formed from conventional heat-retaining materials commonly employed in the construction industry.

Figures 5, 6, 7:
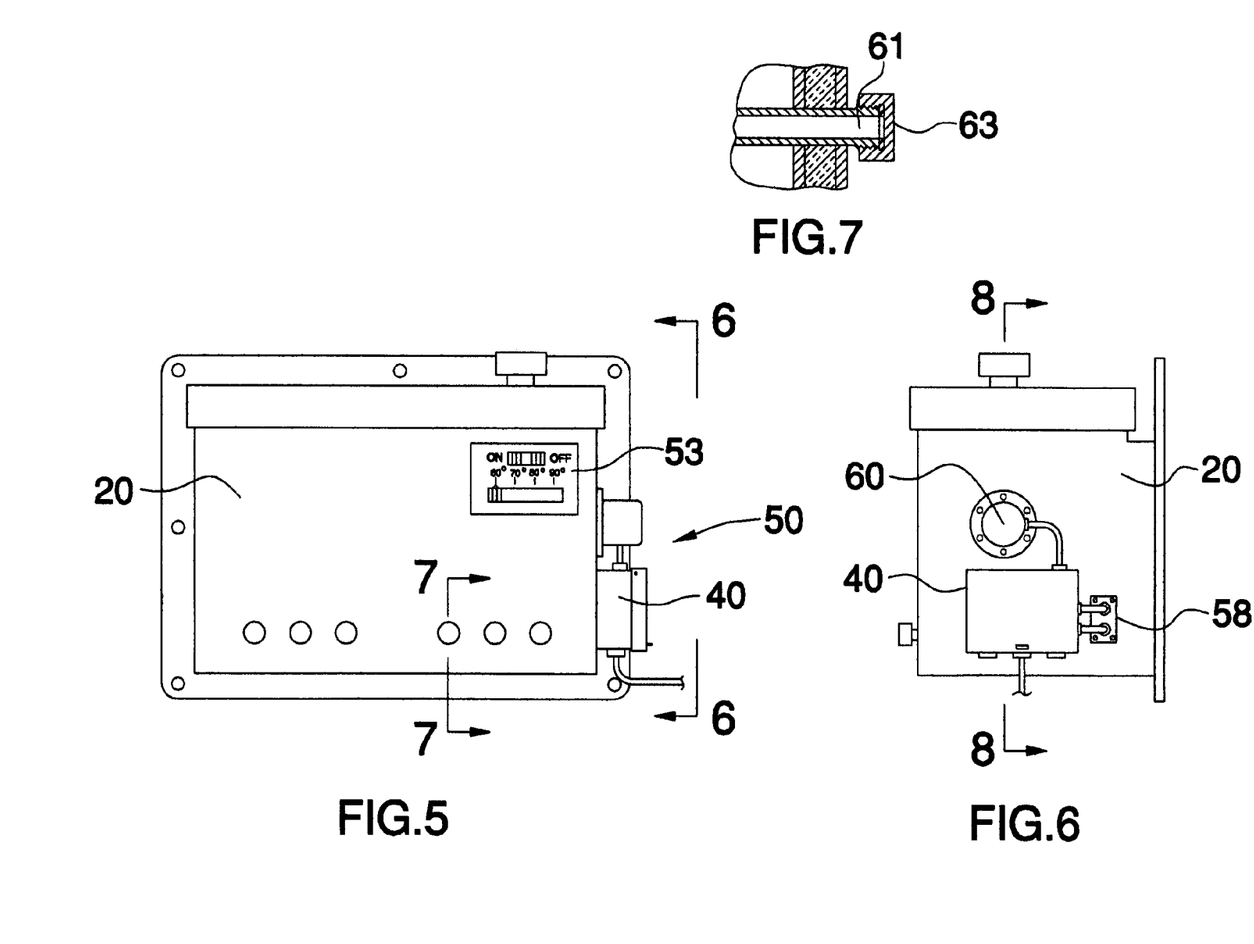
FIG. 5 is a front elevational view of the reservoir shown in FIG. 1.
FIG. 6 is a side elevational view of the reservoir shown in FIG. 5, taken along line 6—6.
FIG. 7 is an enlarged cross-sectional view of a conduit shown in FIG. 5.

Referring to FIGS. 5 and 8, the present invention advantageously includes a mechanism for heating fluid disposed within the reservoir. Such a heating mechanism 50 is operably connected to the reservoir 20 and includes a first section 51 disposed therein and a second section 52 disposed exterior thereof. The heating mechanism 50 further includes a control panel 53 electrically coupled thereto for allowing a user to selectively adjust the first fluid 30a temperature as needed. Of course, the control panel 53 may include a thermostatic dial for allowing a user to selectively adjust the fluid temperature, as needed.

Continuing to refer to FIG. 8 as well as FIG. 6, the heating mechanism 50 preferably includes a pump 60 electrically coupled to the power supply source 40 and a fluid distribution line 54 extending from the pump 60 and into the reservoir 20 for connecting to the plurality of conduits 61 respectively. Referring briefly to the alternate embodiment 10' in FIG. 10, the pump 60 may be positioned within the reservoir 20 or outside the reservoir 20, as desired by the user.

Conventional pumps, commonly employed by fish tanks, may be used for the present invention, for example. The heating mechanism 50 may further include a fluid intake line 55 including a filter 56 and is submerged beneath the fluid level of the reservoir 20. The fluid intake line 55 cooperates with the distribution line 54 for channeling heated fluid thereto. The heating mechanism 50 also includes a heating coil 57 positioned along a bottom surface of the reservoir 20 and subjacent the fluid intake line 55 wherein the heating coil 57 is connected to the power supply source 40 and for heating fluid housed within the reservoir 20.

The heating mechanism 50 preferably further includes a plurality of sensors 58 operably connected to the pump 60 and the power supply source 40 for measuring and displaying the amount of fluid housed within the reservoir 20 and the temperature of the fluid respectively so that an operator can selectively heat the plurality of mats 70 as desired. Advantageously, an operator can program the present invention to selectively heat the plurality of mats 70 when the outside temperature falls below a desired threshold. This feature advantageously eliminates the need of constantly checking sensors 58 and determining when to activate the device 10.

Figure 3:
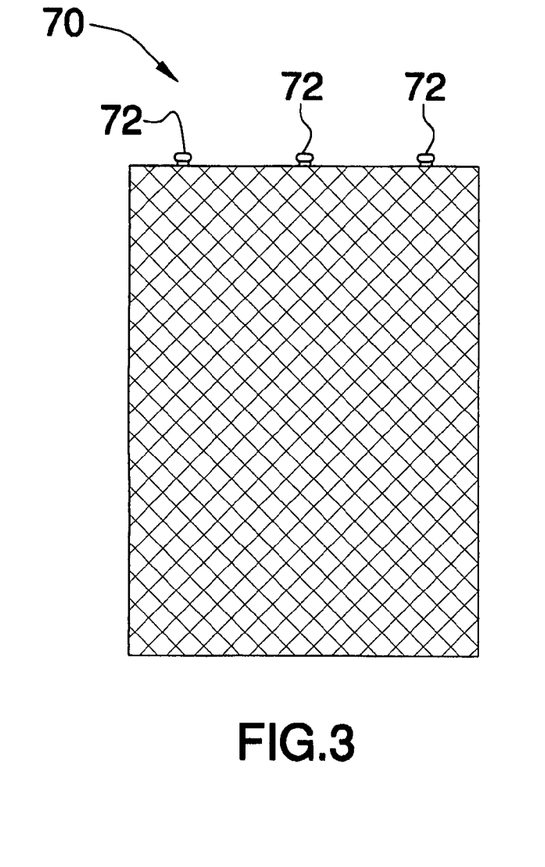
FIG. 3 is an enlarged top plan view of the mat shown in FIG. 1.
Figure 4:
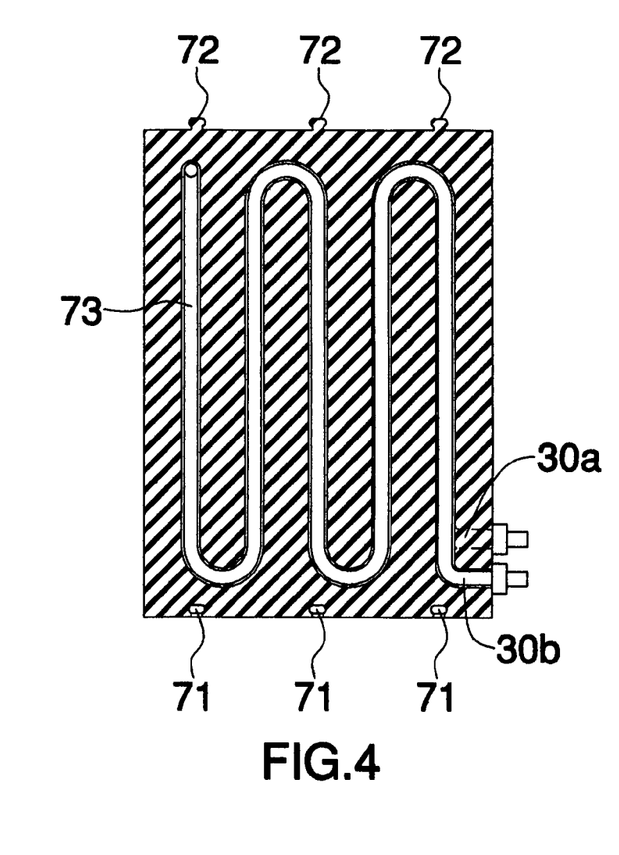
FIG. 4 is a cross-sectional view of the mat shown in FIG. 1, taken along line 4—4.

Referring to FIGS. 3 and 4, the present invention further includes a plurality of mats 70 removably attachable to each other along a selected path. Each mat 70 is coated with a thermal-resistive layer 79, well known to a person of ordinary skill in the art, for assisting the high-temperature fluids passing therethrough to be maintained within a selected tolerance level so that ice and snow can be effectively melted during inclement weather conditions. The plurality of mats 70 are advantageously formed from heat-retaining material and have a plurality of sockets 71 formed therein as well as a plurality of flange portions 72 extending outwardly therefrom.

The plurality of flange portions 72 are oppositely aligned from the plurality of sockets 71 and are removably insertable therein for maintaining the plurality of mats 70 in a contiguous relationship along a substantially rectilinear path. The connection between the plurality of mats 70 is best shown in FIG. 2. Of course, such mats 70 may be arranged in alternate patterns such as along a stepped-up platform or about an annular walk-way, for example.

Each mat 70 further has opposed side portions wherein the plurality of conduits 61 (described hereinbelow) traveling substantially parallel thereto. Advantageously, the plurality of conduits 61 include ancillary portions 73 traversing through the plurality of mats 70 at spaced locations along a length thereof so that heated fluid can be channeled therethrough.

The present invention preferably includes a plurality of elongated and flexible conduits 61 in fluid communication with the reservoir 20 and the plurality of mats 70 for channeling the first temperature fluid 30a towards and through the plurality of mats 70 and for directing the second temperature fluid 30b away from the plurality of mats 70 wherein the second temperature is lower than the first temperature. As can be seen in FIG. 7, the plurality of conduits 61 may also be fitted with a cap 63 for blocking the flow of fluid.

Figures 9, 10:
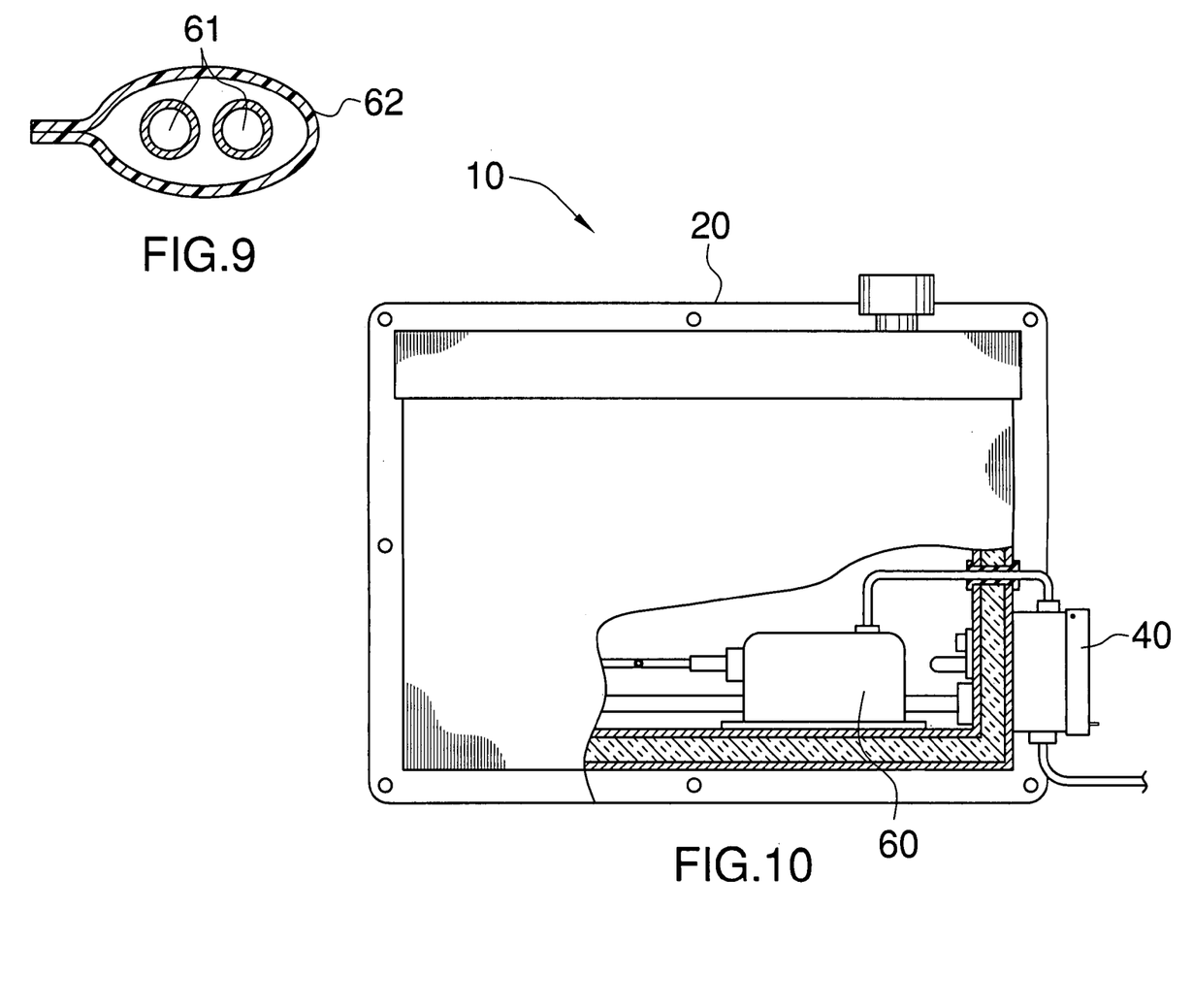
FIG. 9 is an enlarged cross-sectional view of the conduits housed by a protective tube.
FIG. 10 is a partial cross-sectional view showing an alternate embodiment of the present invention wherein the pump is completely disposed within the reservoir.

Referring to FIG. 9, the present invention advantageously includes a protective tube 62 formed from non-corrosive material that is positioned about the plurality of conduits 61. Such a tube 62 extends between the reservoir 20 and a partial length of the plurality mats 70 and is preferably formed from hard plastic for shielding the plurality of conduits 61 from environmental conditions and insulating same during operating conditions.

The appealing features of the device 10 are its safety, labor saving features, environmental friendliness, elimination of corrosive salt, and ease of use. The device 10 will be appreciated by homeowners, renters, and business owners alike who no longer need to worry about manually removing ice from their properties.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A portable device for providing a heated surface to melt snow and ice therefrom, said device comprising:
   a reservoir having a top surface provided with a top opening for receiving a predetermine quantity of fluid therethrough, said reservoir further having a plurality of apertures for directing fluid with a first temperature outwardly therefrom and for receiving fluid with a second temperature;
   means for heating fluid disposed within said reservoir, said heating means being operably connected to said reservoir and including a first section disposed therein and a second section disposed exterior thereof;
   a plurality of mats removably attachable to each other along a selected path, said plurality of mats being formed from heat-retaining material;
   a plurality of elongated and flexible conduits in fluid communication with said reservoir and said plurality of mats, said plurality of conduits for channeling the first temperature fluid towards and through said plurality of mats and for directing the second temperature fluid away from said plurality of mats wherein the second temperature is lower than the first temperature; and
   a power supply source electrically coupled to said heating means.

2. The device of claim 1, wherein said reservoir comprises:
   inner and outer spaced shells forming a gap therebetween and extending about a perimeter of said reservoir, said inner and outer shells being formed from metal;
   a lid removably securable to said top opening and being provided with a conduit for allowing a user to access an interior of said reservoir;
   a cap having a threaded inner surface removably securable to said conduit for assisting to prevent heat and fluid from escaping said reservoir; and
   a flexible layer formed from insulating material disposed medially of said inner and outer shells.

3. The device of claim 1, wherein said heating means comprises:
   a pump electrically coupled to said power supply source;
   a fluid distribution line extending from the pump and into said reservoir for connecting to said plurality of conduits respectively;
   a fluid intake line comprising a filter and being submerged beneath the fluid level of said reservoir, said fluid intake line cooperating with said distribution line for channeling heated fluid thereto; and
   a heating coil positioned along a bottom surface of said reservoir and subjacent said fluid intake line, said heating coil being connected to said power supply source and for heating fluid housed within said reservoir.

4. The device of claim 3, wherein said heating means further comprises:
a plurality of sensors operably connected to said pump and said power supply source for measuring and displaying the amount of fluid housed within said reservoir and the temperature of the fluid respectively so that an operator can selectively heat said plurality of mats as desired.

5. The device of claim 1, wherein said plurality of mats have a plurality of sockets formed therein and comprise: a plurality of flange portions extending outwardly therefrom;
wherein said plurality of flange portions are oppositely aligned from said plurality of sockets and are removably insertable therein for maintaining said plurality of mats in a contiguous relationship along a substantially rectilinear path.

6. The device of claim 1, wherein each said plurality of mats further has opposed side portions with said plurality of conduits traveling substantially parallel to one said side portion, said plurality of conduits further including ancillary portions traversing through said plurality of mats at spaced locations along a length thereof.

7. A portable device for providing a heated surface to melt snow and ice therefrom, said device comprising:
a reservoir having a top surface provided with a top opening for receiving a predetermine quantity of fluid therethrough, said reservoir further having a plurality of apertures for directing fluid with a first temperature outwardly therefrom and for receiving fluid with a second temperature;
means for heating fluid disposed within said reservoir, said heating means being operably connected to said reservoir and including a first section disposed therein and a second section disposed exterior thereof;
a plurality of mats removably attachable to each other along a selected path, said plurality of mats being formed from heat-retaining material;
a plurality of elongated and flexible conduits in fluid communication with said reservoir and said plurality of mats, said plurality of conduits for channeling the first temperature fluid towards and through said plurality of mats and for directing the second temperature fluid away from said plurality of mats wherein the second temperature is lower than the first temperature;
a power supply source electrically coupled to said heating means; and
a protective tube formed from non-corrosive material and being positioned about said plurality of conduits, said tube extending between said reservoir and a partial length of said plurality of mats.

8. The device of claim 7, wherein said reservoir comprises:
inner and outer spaced shells forming a gap therebetween and extending about a perimeter of said reservoir, said inner and outer shells being formed from metal;
a lid removably securable to said top opening and being provided with a conduit for allowing a user to access an interior of said reservoir;
a cap having a threaded inner surface removably securable to said conduit for assisting to prevent heat and fluid from escaping said reservoir; and
a flexible layer formed from insulating material disposed medially of said inner and outer shells.

9. The device of claim 7, wherein said heating means comprises:
a pump electrically coupled to said power supply source;
a fluid distribution line extending from the pump and into said reservoir for connecting to said plurality of conduits respectively;
a fluid intake line comprising a filter and being submerged beneath the fluid level of said reservoir, said fluid intake line cooperating with said distribution line for channeling heated fluid thereto; and
a heating coil positioned along a bottom surface of said reservoir and subjacent said fluid intake line, said heating coil being connected to said power supply source and for heating fluid housed within said reservoir.

10. The device of claim 9, wherein said heating means further comprises:
a plurality of sensors operably connected to said pump and said power supply source for measuring and displaying the amount of fluid housed within said reservoir and the temperature of the fluid respectively so that an operator can selectively heat said plurality of mats as desired.

11. The device of claim 7, wherein said plurality of mats have a plurality of sockets formed therein and comprise: a plurality of flange portions extending outwardly therefrom;
wherein said plurality of flange portions are oppositely aligned from said plurality of sockets and are removably insertable therein for maintaining said plurality of mats in a contiguous relationship along a substantially rectilinear path.

12. The device of claim 7, wherein each said plurality of mats further has opposed side portions with said plurality of conduits traveling substantially parallel to one said side portion, said plurality of conduits further including ancillary portions traversing through said plurality of mats at spaced locations along a length thereof.

13. A portable device for providing a heated surface to melt snow and ice therefrom, said device comprising:
a reservoir having a top surface provided with a top opening for receiving a predetermine quantity of fluid therethrough, said reservoir further having a plurality of apertures for directing fluid with a first temperature outwardly therefrom and for receiving fluid with a second temperature;
means for heating fluid disposed within said reservoir, said heating means being operably connected to said reservoir and including a first section disposed therein and a second section disposed exterior thereof, said heating means comprising a control panel electrically coupled thereto and for allowing a user to selectively adjust the first fluid temperature as needed;
a plurality of mats removably attachable to each other along a selected path, said plurality of mats being formed from heat-retaining material;
a plurality of elongated and flexible conduits in fluid communication with said reservoir and said plurality of mats, said plurality of conduits for channeling the first temperature fluid towards and through said plurality of mats and for directing the second temperature fluid away from said plurality of mats wherein the second temperature is lower than the first temperature;
a power supply source electrically coupled to said heating means; and
a protective tube formed from non-corrosive material and being positioned about said plurality of conduits, said tube extending between said reservoir and a partial length of said plurality of mats.

14. The device of claim 13, wherein said reservoir comprises:
- inner and outer spaced shells forming a gap therebetween and extending about a perimeter of said reservoir, said inner and outer shells being formed from metal;
- a lid removably securable to said top opening and being provided with a conduit for allowing a user to access an interior of said reservoir;
- a cap having a threaded inner surface removably securable to said conduit for assisting to prevent heat and fluid from escaping said reservoir; and
- a flexible layer formed from insulating material disposed medially of said inner and outer shells.

15. The device of claim 13, wherein said heating means comprises:
- a pump electrically coupled to said power supply source;
- a fluid distribution line extending from the pump and into said reservoir for connecting to said plurality of conduits respectively;
- a fluid intake line comprising a filter and being submerged beneath the fluid level of said reservoir, said fluid intake line cooperating with said distribution line for channeling heated fluid thereto; and
- a heating coil positioned along a bottom surface of said reservoir and subjacent said fluid intake line, said heating coil being connected to said power supply source and for heating fluid housed within said reservoir.

16. The device of claim 15, wherein said heating means further comprises:
- a plurality of sensors operably connected to said pump and said power supply source for measuring and displaying the amount of fluid housed within said reservoir and the temperature of the fluid respectively so that an operator can selectively heat said plurality of mats as desired.

17. The device of claim 13, wherein said plurality of mats have a plurality of sockets formed therein and comprise: a plurality of flange portions extending outwardly therefrom;
- wherein said plurality of flange portions are oppositely aligned from said plurality of sockets and are removably insertable therein for maintaining said plurality of mats in a contiguous relationship along a substantially rectilinear path.

18. The device of claim 13, wherein each said plurality of mats further has opposed side portions with said plurality of conduits traveling substantially parallel to one said side portion, said plurality of conduits further including ancillary portions traversing through said plurality of mats at spaced locations along a length thereof.

* * * * *